United States Patent
Lenz

(10) Patent No.: US 12,351,530 B2
(45) Date of Patent: Jul. 8, 2025

(54) FIBER REINFORCED COMPOSITE AND METHOD OF MAKING

(71) Applicant: RTX Corporation, Farmington, CT (US)

(72) Inventor: Brendan M. Lenz, Wethersfield, CT (US)

(73) Assignee: RTX CORPORATION, Farmington, CT (US)

( * ) Notice: Subject to any disclaimer, the term of this patent is extended or adjusted under 35 U.S.C. 154(b) by 469 days.

(21) Appl. No.: 17/070,069

(22) Filed: Oct. 14, 2020

(65) Prior Publication Data
US 2021/0114945 A1    Apr. 22, 2021

Related U.S. Application Data

(60) Provisional application No. 62/916,888, filed on Oct. 18, 2019.

(51) Int. Cl.
| | | |
|---|---|---|
| *C04B 41/45* | (2006.01) | |
| *C04B 35/63* | (2006.01) | |
| *C04B 35/76* | (2006.01) | |

(52) U.S. Cl.
CPC ...... *C04B 41/4564* (2013.01); *C04B 35/6303* (2013.01); *C04B 35/76* (2013.01);
(Continued)

(58) Field of Classification Search
CPC .............. C04B 41/456; C04B 35/6303; C04B 35/76; C04B 35/80; C04B 2235/5228;
(Continued)

(56) References Cited

U.S. PATENT DOCUMENTS 5,468,358 A * 11/1995 Ohkawa .................. C04B 35/83
419/13
5,531,260 A *  7/1996 Burke ................. C04B 41/4519
164/97
(Continued)

FOREIGN PATENT DOCUMENTS

CN      108218457 A  *  6/2018  .......... C04B 35/565
EP        2896607 B1      8/2016
(Continued)

OTHER PUBLICATIONS

Chrambach et al. Polyacrylamide Gel Electrophoresis. Science, vol. 172, Issue 3982 Apr. 1971. p. 440-451.*
(Continued)

*Primary Examiner* — Xiuyu Tai
(74) *Attorney, Agent, or Firm* — CANTOR COLBURN LLP

(57) ABSTRACT

A method of making a fiber reinforced composite includes: infiltrating a preform having a perimeter with an electrophoretic gel; adding nanoparticles to wells located in the electrophoretic gel outside the preform perimeter; introducing the nanoparticles to the preform using gel electrophoresis; removing the electrophoretic gel to result in a preform having embedded nanoparticles; and infiltrating the preform having embedded nanoparticles with a matrix material or a matrix material precursor.

12 Claims, 1 Drawing Sheet

(52) U.S. Cl.
CPC ............... *C04B 2235/5228* (2013.01); *C04B 2235/5232* (2013.01); *C04B 2235/5244* (2013.01); *C04B 2235/5248* (2013.01); *C04B 2235/5256* (2013.01); *C04B 2235/5436* (2013.01); *C04B 2235/5445* (2013.01); *C04B 2235/614* (2013.01)

(58) Field of Classification Search
CPC .... C04B 2235/5232; C04B 2235/5244; C04B 2235/5248; C04B 2235/5256; C04B 2235/5436; C04B 2235/5445; C04B 2235/614; C04B 41/4564; C04B 35/563; C04B 35/65; C04B 35/5607; C04B 35/62894; C04B 35/573; C04B 35/565; C04B 35/515; C04B 35/6264; C04B 35/62863; C04B 35/6263; C04B 35/584; C04B 35/62892; C04B 35/657; C04B 2235/428; C04B 2235/3839; C04B 2235/5472; C04B 2235/3873; C04B 2235/5224; C04B 2235/427; C04B 2235/524; C04B 2235/3821; C04B 2235/616; C04B 2235/3826; C25D 5/10; C25D 5/617; C25D 13/02; Y10T 428/24926; Y10T 428/12021; Y10T 428/12458; H01S 3/0612; H01S 3/1685
See application file for complete search history.

(56) References Cited

U.S. PATENT DOCUMENTS

| | | | | |
|---|---|---|---|---|
| 5,817,432 A | * | 10/1998 | Chwastiak | C04B 35/62857 428/698 |
| 5,840,221 A | * | 11/1998 | Lau | C04B 35/62871 264/29.7 |
| 5,919,347 A | * | 7/1999 | Gal-Or | C25D 1/14 204/490 |
| 6,059,949 A | * | 5/2000 | Gal-Or | C04B 41/86 433/222.1 |
| 6,607,645 B1 | * | 8/2003 | Sarkar | C04B 38/00 204/507 |
| 6,908,667 B2 | * | 6/2005 | Christ | C04B 41/52 188/205 R |
| 2010/0009143 A1 | | 1/2010 | Pailler et al. | |
| 2012/0269218 A1 | * | 10/2012 | Worsley | C25D 5/10 372/39 |
| 2017/0313627 A1 | * | 11/2017 | Shim | C04B 35/563 |
| 2018/0154019 A1 | * | 6/2018 | Voelcker | A61P 17/02 |
| 2023/0026872 A1 | * | 1/2023 | Burrows | A61K 31/44 |

FOREIGN PATENT DOCUMENTS

| | | |
|---|---|---|
| KR | 101179652 B1 | 9/2012 |
| KR | 101804944 B1 | 12/2017 |

OTHER PUBLICATIONS

Giunta et al. Preparation of Mesoporous Silica Monoliths with Ordered Arrays of Macrochannels Templated from Electric-Field-Oriented Hydrogels. Angewandte. vol. 43, Issue 12. Mar. 12, 2004.*

European Search Report for European Application No. 20202408.9; Application Filing Date: Oct. 16, 2020; Date of Mailing: Feb. 25, 2021; 7 pages.

Boccaccini et al. Application of electrophoretic and electrolytic deposition techniques in ceramics processing, Current Opinion in Solid State and Materials Science 6 (2002) 251-260.

Binner et al., "Selection, processing, properties and applications of ultra-high temperature ceramic matrix composites, UHTCMCs—a review", International Materials Review, 2019, pp. 1-57.

Boccaccini et al., "Processing Ceramic-Matrix Composites Using Electrophoretic Deposition", Journal of Metals, vol. 47, No. 10, Oct. 1, 1995, pp. 34-37.

European Office Action for EP Application No. 20202408.9, dated Feb. 2, 2023, pp. 1-8.

* cited by examiner

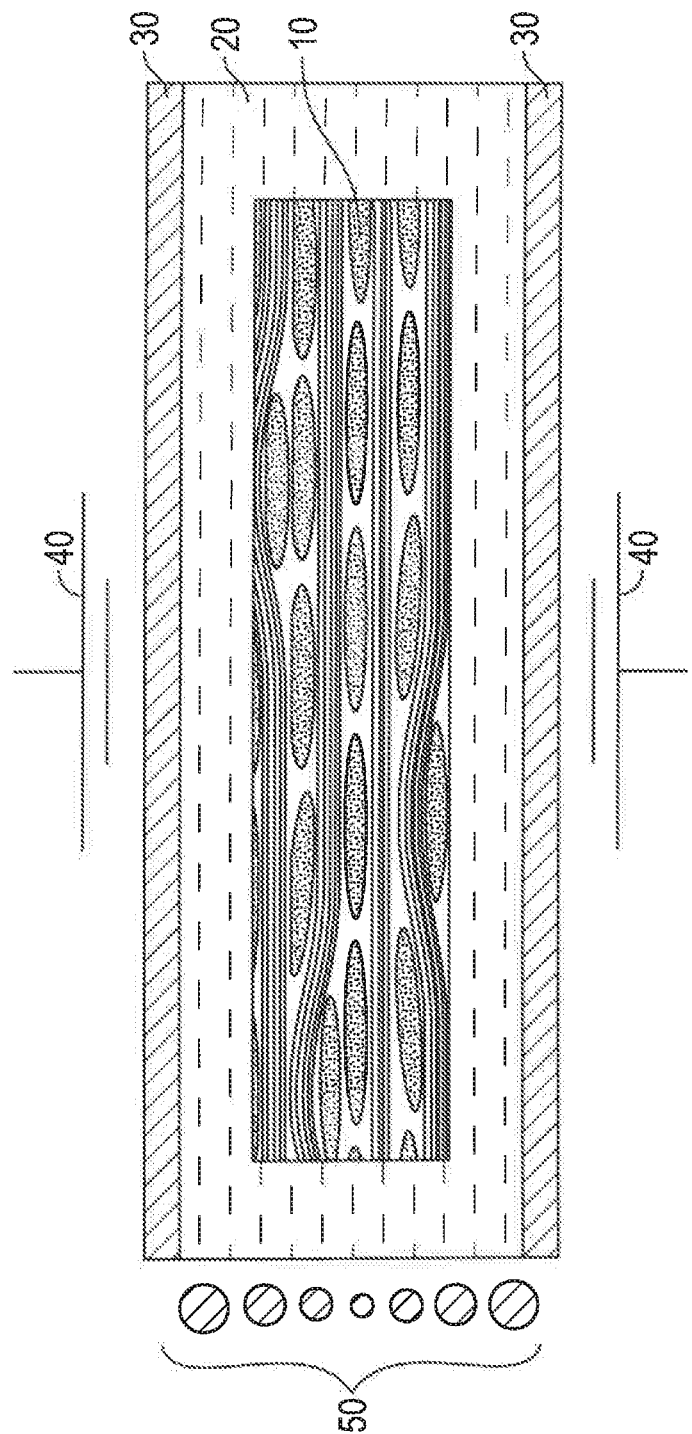

FIBER REINFORCED COMPOSITE AND METHOD OF MAKING

CROSS-REFERENCE TO RELATED APPLICATIONS

This application claims the benefit of U.S. Provisional Application No. 62/916,888 filed Oct. 18, 2019, the disclosure of which is incorporated herein by reference in its entirety.

BACKGROUND

Exemplary embodiments pertain to the art of making fiber reinforced composites and the resulting composites.

Generally, the fiber-reinforcement of otherwise brittle ceramic materials offers significant opportunities to toughen the brittle matrix; therefore, fiber preforms are used as starting material for incorporation within a surrounding ceramic matrix.

A number of techniques have been developed for incorporating a ceramic matrix into a fiber preform, techniques which include chemical vapor infiltration (CVD or CVI). In CVI the preform is placed in a reactor where it is exposed to precursor gasses and a reactive environment where ceramic material is deposited onto free surfaces of the fiber and forms a matrix. CVI is a relatively slow process and it is desirable to find ways to reduce the time required to form the matrix.

BRIEF DESCRIPTION

Disclosed is a method of making a fiber reinforced composite including: infiltrating a preform having a perimeter with an electrophoretic gel; adding nanoparticles to wells located in the electrophoretic gel outside the preform perimeter; introducing the nanoparticles to the preform using gel electrophoresis; removing the electrophoretic gel to result in a preform having embedded nanoparticles; and infiltrating the preform having embedded nanoparticles with a matrix material or a matrix material precursor.

In addition to one or more of the features described above, or as an alternative to any of the foregoing embodiments, the nanoparticles embedded in the preform have a size gradient.

In addition to one or more of the features described above, or as an alternative to any of the foregoing embodiments, the preform includes uniaxial fiber layup, a 2D woven fabric layup, 3D weave or a combination thereof. The fiber used includes carbon, $Al_2O_3$—$SiO_2$, SiC, silicon dioxide ($SiO_2$), aluminum silicate, aluminum oxide ($Al_2O_3$), titanium oxide ($TiO_2$), zirconium silicate, silicon nitride, boron nitride (BN), and combinations thereof.

In addition to one or more of the features described above, or as an alternative to any of the foregoing embodiments, the nanoparticles include carbon (C), silicon carbide (SiC), silicon oxide ($SiO_2$), boron nitride (BN), boron carbide ($B_4C$), aluminum oxide ($Al_2O_3$), zirconium oxide ($ZrO_2$), zirconium boride ($ZrB_2$), zinc oxide ($ZnO_2$), molybdenum disulfide ($MoS_2$), silicon nitride ($Si_3N_4$), and combinations thereof.

In addition to one or more of the features described above, or as an alternative to any of the foregoing embodiments, the electrophoretic gel includes agarose, polyacrylamide, starch, and combinations thereof.

In addition to one or more of the features described above, or as an alternative to any of the foregoing embodiments, the matrix material includes carbon (C), silicon carbide (SiC), silicon oxide ($SiO_2$), boron nitride (BN), boron carbide ($B_4C$), aluminum oxide ($Al_2O_3$), zirconium oxide ($ZrO_2$), zirconium boride ($ZrB_2$), zinc oxide ($ZnO_2$) molybdenum disulfide ($MoS_2$), silicon nitride ($Si_3N_4$), and combinations thereof.

In addition to one or more of the features described above, or as an alternative to any of the foregoing embodiments, the nanoparticles have sizes of 0.1 to 100 micrometers (um).

In addition to one or more of the features described above, or as an alternative to any of the foregoing embodiments, the nanoparticles are present in an amount of 1 to 20 weight percent (wt %) based on the weight of the preform.

In addition to one or more of the features described above, or as an alternative to any of the foregoing embodiments, the method further includes densifying the preform having an infiltrated matrix material and embedded nanoparticles to form a fiber reinforced composite having a porosity less than 15%.

In addition to one or more of the features described above, or as an alternative to any of the foregoing embodiments, the preform includes carbon, $Al_2O_3$—$SiO_2$, SiC, silicon dioxide ($SiO_2$), aluminum silicate, aluminum oxide ($Al_2O_3$), titanium oxide ($TiO_2$), zirconium silicate, silicon nitride, boron nitride (BN), and combinations thereof Also disclosed is a fiber reinforced composite including a fiber structure, a matrix and embedded nanoparticles having a size gradient within the fiber structure.

In addition to one or more of the features described above, or as an alternative to any of the foregoing embodiments, the fiber structure includes carbon, $Al_2O_3$—$SiO_2$, SiC, silicon dioxide ($SiO_2$), aluminum silicate, aluminum oxide ($Al_2O_3$), titanium oxide ($TiO_2$), zirconium silicate, silicon nitride, boron nitride (BN), and combinations thereof.

In addition to one or more of the features described above, or as an alternative to any of the foregoing embodiments, the matrix includes carbon (C), silicon carbide (SiC), silicon oxide ($SiO_2$), boron nitride (BN), boron carbide ($B_4C$), aluminum oxide ($Al_2O_3$), zirconium oxide ($ZrO_2$), zirconium boride ($ZrB_2$), zinc oxide ($ZnO_2$), molybdenum disulfide ($MoS_2$), silicon nitride ($Si_3N_4$), and combinations thereof.

In addition to one or more of the features described above, or as an alternative to any of the foregoing embodiments, the nanoparticles include carbon (C), silicon carbide (SiC), silicon oxide ($SiO_2$), boron nitride (BN), boron carbide ($B_4C$), aluminum oxide ($Al_2O_3$), zirconium oxide ($ZrO_2$), zirconium boride ($ZrB_2$), zinc oxide ($ZnO_2$), molybdenum disulfide ($MoS_2$), silicon nitride ($Si_3N_4$). and combinations thereof.

In addition to one or more of the features described above, or as an alternative to any of the foregoing embodiments, the nanoparticles have sizes of 0.1 to 100 micrometers (um).

In addition to one or more of the features described above, or as an alternative to any of the foregoing embodiments, the nanoparticles are present in an amount of 1 to 20 weight percent (wt %), based on the total weight of the fiber structure.

In addition to one or more of the features described above, or as an alternative to any of the foregoing embodiments, the fiber reinforced composite has a porosity of 5 to 15%.

BRIEF DESCRIPTION OF THE DRAWINGS

The following descriptions should not be considered limiting in any way. With reference to the accompanying drawings, like elements are numbered alike:

FIG. 1 is representation of an exemplary electrophoretic system.

DETAILED DESCRIPTION

A detailed description of one or more embodiments of the disclosed apparatus and method are presented herein by way of exemplification and not limitation with reference to the FIGURE.

Typical CVI processes often have long reactor runs to fully infiltrate the porous network of the preform with a matrix. This is mainly due to the scale of the large open spaces relative to the slow deposition rate of the matrix. Introducing nanoparticles to the open spaces (pores) prior to forming the matrix using CVI offers a way to reduce the size of the open spaces and to offer more surface area for deposition. Typically the nanoparticles have a distribution of particle sizes and the larger particles can block off interior spaces for deposition resulting in a greater than desired porosity in the final product. Using gel electrophoresis to introduce the nanoparticles to the preform results in the nanoparticles being introduced and deposited in a controlled size gradient with the smaller particles located in the central portion of the preform and the larger particles located closer to the perimeter. The smaller particles move more quickly in the electrophoretic field and hence infiltrate farther into the preform. Because the smaller particles move ahead of the larger particles the larger particles cannot limit access to the interior portions of the preform.

The preform is infiltrated with electrophoretic gel. In some embodiments this comprises applying a vacuum to the preform and then submerging the preform in electrophoretic gel (also referred to as carrier gel), causing the gel to infiltrate the preform. Nanoparticles are introduced to wells in the electrophoretic gel. The nanoparticles may be in suspension or slurry. The suspension or slurry may be ultrasonicated prior to being introduced to the wells in the gel. The wells are located outside of the perimeter of the preform. FIG. 1 shows preform 10 in a tank of electrophoresis gel 20 having wells 30. Electrodes 40 are located on either side of the tank. Indicators 50 represent the nanoparticle distribution after electrophoresis.

A voltage is applied from one or multiple sides of the preform, causing the nanoparticles to infiltrate into the preform. When a voltage is applied to multiple sides of the preform it may be applied simultaneously or sequentially. The extent of the nanoparticle movement is a factor of both time and voltage. The smaller nanoparticles move more quickly and thus infiltrate into the preform before the larger nanoparticles and penetrate more deeply into the preform. This results in a size gradient within the preform. The gel can then be removed and the matrix deposited.

A preform is a fiber structure or network that has sufficient wet strength to retain integrity in the electrophoretic gel. It can be of any suitable character including, but not limited to, woven fiber cloth arrangements, 3-dimensional woven structures, or even random fiber arrangements such as are found in air-laid or water-laid materials. Generally, fibers which are used are in the form of continuous fibrous tows constituting bundles of 100 to 3,000 fibers or microfilaments per tow, with the individual fibers, usually having a diameter of about 10 micrometers or less. As employed herein, the term "continuous" refers to fibers or filaments having a substantial length such that they might be woven into a fabric or like 2-dimensional or 3-dimensional structure, if desired. Generally, the fibers that are used are at least about 10 centimeters (cm) in length and between about 5 and about 15 micrometers in diameter. However, larger fibers can be used, e.g. up to about 150 to 200 micrometers in diameter if desired for particular purposes. Exemplary fibers include carbon, $Al_2O_3$—$SiO_2$, SiC, silicon dioxide ($SiO_2$), aluminum silicates, such as mullite, aluminum oxide ($Al_2O_3$), titanium oxide ($TiO_2$), zirconium silicate, silicon nitride and boron nitride (BN), as well as fibers from other high temperature oxides, nitrides, carbides, silicates and the like known in the art of refractory fibers as useful in making composites.

The electrophoretic gel may include agarose, polyacrylamide, starch or a combination thereof.

Exemplary nanoparticle materials include carbon (C), silicon carbide (SiC), silicon oxide ($SiO_2$), boron nitride (BN), boron carbide ($B_4C$), aluminum oxide ($Al_2O_3$), zirconium oxide ($ZrO_2$), zirconium boride ($ZrB_2$), zinc oxide ($ZnO_2$), molybdenum disulfide ($MoS_2$), silicon nitride ($Si_3N_4$), and combinations thereof. In order to travel in the electrophoretic filed the nanoparticles must carry a charge. The nanoparticles may have functional groups grafted onto the surface to facilitate carrying the desired charge or may be coated in a surfactant or similar material to provide functional groups. The nanoparticles may have a size distribution of 0.1 to 100 micrometers, or 0.1 to 50 micrometers. Size, as used herein in reference to nanoparticles, designates the largest linear dimension of the particle. "Particles" as defined herein are objects whose ratio between the largest linear dimension and the smallest linear dimension is between 1 and 1.2. The amount of nanoparticles may be 1 to 20, or 5 to 15 weight percent, based on the total weight of the preform.

After electrophoresis the electrophoretic gel is removed by a low temperature heat treatment (less than or equal to 750° F. in an inert atmosphere, an air atmosphere or a hydrogen atmosphere) to result in a preform having nanoparticles located within the preform structure. The preform is then infiltrated with the matrix or a matrix precursor. The matrix may be deposited using chemical vapor infiltration (CVI) or other appropriate methods.

Exemplary matrices include carbon (C), silicon carbide (SiC), silicon oxide ($SiO_2$), boron nitride (BN), boron carbide ($B_4C$), aluminum oxide ($Al_2O_3$), zirconium oxide ($ZrO_2$), zirconium boride ($ZrB_2$), zinc oxide ($ZnO_2$), molybdenum disulfide ($MoS_2$), silicon nitride ($Si_3N_4$), and combinations thereof. In some embodiments the nanoparticles and the matrix comprise the same material and during deposition of the matrix material or subsequent processing the nanoparticles combined with the deposited material to form a single material. In some embodiments the nanoparticles and the matrix comprise different materials. It is contemplated that the nanoparticles and the matrix may react to form an additional material at the interface of the two. Subsequent processing may include hot pressing, sintering and the like.

The fiber reinforced composite may have a porosity less than or equal to 15%, or, less than or equal to 12%. In some embodiments the porosity is 5 to 15%. The fiber reinforced composite may have a nanoparticle size gradient ranging from smallest in the central portion of the composite to largest at the perimeter of the composite. The fiber reinforced composite may also have a nanoparticle size gradient ranging from smallest on a first side of the fiber reinforced composite to largest on the second side of the fiber reinforced composite.

If using nanoparticles having a size that is less than the diameter of the fibers used to make the tow, it may be useful to deposit an initial coating of the matrix onto the preform prior to infiltrating with the electrophoretic gel and preforming electrophoresis. The initial coating of the matrix may have a thickness that is sufficient to close the porous entrances to internal surface of the tow, typically less than or equal to half the diameter of the fibers used to make the tow. Without being bound by theory it is believed that the initial coating will prevent the smaller nanoparticles from infiltrating the spaces between the fibers in the tow by acting as a physical barrier. For example, if the preform includes fibers having a diameter of 12 micrometers and a portion of the particles have a size less than or equal to 12 micrometers, then the preform with an initial coating of matrix having a thickness of 3 to 6 micrometers would likely to be sufficient to build up this barrier.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A method of making a fiber reinforced composite comprising:
    infiltrating a preform with an electrophoretic gel, the preform having a perimeter and comprising a fiber structure, the preform in a tank of the electrophoretic gel;
    adding particles to wells located in the tank outside the preform perimeter; wherein the particles comprise nanoparticles having a size that is less than the diameter of the fibers used to make a tow; and wherein an initial coating of a matrix material is disposed onto the preform prior to infiltrating the preform with the electrophoretic gel and preforming electrophoresis;
    introducing the particles to the preform using gel electrophoresis, wherein a voltage is applied from multiple sides of the preform during the gel electrophoresis and the voltage is applied simultaneously or sequentially;
    removing the electrophoretic gel to result in a preform having embedded particles; and
    infiltrating the preform having embedded particles with the matrix material or a matrix material precursor, wherein
    1) The preform comprises carbon fiber, SiC fiber, $Al_2O_3$—$SiO_2$ fiber, silicon dioxide ($SiO_2$) fiber, aluminum silicate fiber, aluminum oxide ($Al_2O_3$) fiber, titanium oxide ($TiO_2$) fiber, zirconium silicate fiber, silicon nitride fiber, boron nitride (BN) fiber, and combinations thereof,
    2) The particles comprise carbon (C), silicon oxide ($SiO_2$), boron nitride (BN), boron carbide ($B_4C$), aluminum oxide ($Al_2O_3$), zirconium oxide ($ZrO_2$), zirconium boride ($ZrB_2$), zinc oxide ($ZnO_2$), molybdenum disulfide ($MoS_2$), silicon nitride ($Si_3N_4$), and combinations thereof, and/or
    3) The matrix material comprises carbon (C), silicon carbide (SiC), silicon oxide ($SiO_2$), boron nitride (BN), boron carbide ($B_4C$), aluminum oxide ($Al_2O_3$), zirconium oxide ($ZrO_2$), zirconium boride ($ZrB_2$), zinc oxide ($ZnO_2$), molybdenum disulfide ($MoS_2$), silicon nitride ($Si_3N_4$), and combinations thereof.

2. The method of claim 1, wherein introducing the particles to the preform using gel electrophoresis results in the particles being introduced and deposited in a controlled size gradient.

3. The method of claim 1, wherein the preform comprises uniaxial fiber layup, a 2D woven fabric layup, 3D weave or a combination thereof.

4. The method of claim 1, wherein the preform comprises carbon fiber, $Al_2O_3$—$SiO_2$ fiber, SiC fiber, silicon dioxide ($SiO_2$) fiber, aluminum silicate fiber, aluminum oxide ($Al_2O_3$) fiber, titanium oxide ($TiO_2$) fiber, zirconium silicate fiber, silicon nitride fiber, boron nitride (BN) fiber, and combinations thereof.

5. The method of claim 1, wherein the particles comprise carbon (C), silicon carbide (SiC), silicon oxide ($SiO_2$), boron nitride (BN), boron carbide ($B_4C$), aluminum oxide ($Al_2O_3$), zirconium oxide ($ZrO_2$), zirconium boride ($ZrB_2$), zinc oxide ($ZnO_2$), molybdenum disulfide ($MoS_2$), silicon nitride ($Si_3N_4$), and combinations thereof.

6. The method of claim 1, wherein the electrophoretic gel comprises agarose, polyacrylamide, starch or a combination thereof.

7. The method of claim 1, wherein the matrix material comprises carbon (C), silicon carbide (SiC), silicon oxide ($SiO_2$), boron nitride (BN), boron carbide ($B_4C$), aluminum oxide ($Al_2O_3$), zirconium oxide ($ZrO_2$), zirconium boride ($ZrB_2$), zinc oxide ($ZnO_2$), molybdenum disulfide ($MoS_2$), Silicon nitride ($Si_3N_4$), and combinations thereof.

8. The method of claim 1, wherein the particles further have sizes of 0.1 to 100 micrometers (μm).

9. The method of claim 1, wherein the particles are present in an amount of 1 to 20 wt % based on the weight of the preform.

10. The method of claim 1, further comprising densifying the preform having an infiltrated matrix material and embedded particles to form a fiber reinforced composite having a porosity less than 15%.

11. The method of claim 1, wherein the particles have functional groups grafted onto a surface or are coated in a surfactant to provide functional groups.

12. The method of claim 2, wherein the controlled size gradient has a particle size gradient ranging from smallest on a first size of the fiber reinforced composite to largest on a second side of the fiber reinforced composite.

* * * * *